(12) United States Patent
Zhao et al.

(10) Patent No.: US 9,565,270 B2
(45) Date of Patent: Feb. 7, 2017

(54) LPC2468-BASED MVB-WTB GATEWAY AND WORKING METHOD THEREOF

(71) Applicant: Institute of Software, Chinese Academy of Sciences, Beijing (CN)

(72) Inventors: Chen Zhao, Beijing (CN); Mingshu Li, Beijing (CN); Bin Wu, Beijing (CN); Dong Huang, Beijing (CN); Wei-wei Hou, Beijing (CN); Yuanming Pan, Beijing (CN); Liang Guo, Beijing (CN)

(73) Assignee: Institute of Software, Chinese Academy of Sciences, Beijing (CN)

(*) Notice: Subject to any disclaimer, the term of this patent is extended or adjusted under 35 U.S.C. 154(b) by 185 days.

(21) Appl. No.: 14/434,182

(22) PCT Filed: Oct. 19, 2012

(86) PCT No.: PCT/CN2012/083193
§ 371 (c)(1),
(2) Date: Apr. 8, 2015

(87) PCT Pub. No.: WO2014/056248
PCT Pub. Date: Apr. 17, 2014

(65) Prior Publication Data
US 2015/0237156 A1    Aug. 20, 2015

(30) Foreign Application Priority Data

Oct. 11, 2012  (CN) .......................... 2012 1 0384476

(51) Int. Cl.
*G06F 15/16* (2006.01)
*H04L 29/08* (2006.01)

(52) U.S. Cl.
CPC ............. *H04L 67/288* (2013.01); *H04L 67/10* (2013.01)

(58) Field of Classification Search
CPC .. H04L 29/08; H04L 12/6418; H04L 12/4625; H04L 12/40; H04L 2012/40293; H04L 67/10; H04L 67/288
See application file for complete search history.

(56) References Cited

FOREIGN PATENT DOCUMENTS

| CN | 101022378 A | * | 8/2007 |
| CN | 102991536 B | * | 11/2015 |

* cited by examiner

*Primary Examiner* — Benjamin M Thieu
(74) *Attorney, Agent, or Firm* — SV Patent Service

(57) ABSTRACT

The present invention discloses a LPC2468-based MVB-WTB gateway and associated operating methods in the field of train communications. The disclosed network gateway includes a MVB network card and a WTB network card. The WTB network card includes WTB-ARM and a WTB-FPGA module. The MVB network card includes MVB-ARM and MVB-FPGA module. The WTB-ARM module uses a LPC2468 processor to analyze data in the network layer and the data link layer based on gateway protocol. The WTB-FPGA module allows WTB to exchange data with other networks gateways, as well as between the WTB and MVB. The MVB-ARM module is responsible for executing protocols on the network cards. Via data communications on MVB, the MVB-FPGA module collects the process and message data of the MVB equipment, and exchange communication data between WTB within a network gateway. The present invention can increase speed and enhance reliability for communications between gateways.

10 Claims, 2 Drawing Sheets

LPC2468-BASED MVB-WTB GATEWAY AND WORKING METHOD THEREOF

TECHNICAL FIELD

The present invention relates to the field of train communications, and in particular to LPC2468-based MVB-WTB gateway and its working method. Gateway is the most important part of train communications; its real-time performance, stability, and reliability play a vital role in the trains' safe operations.

BACKGROUND OF THE INVENTION

MVB-WTB gateway is an implementation method for locomotive communications. Based on the characteristics of the train control, train communication network (TCN) can be divided into two buses: WTB (Wired Train Bus) that connects to each compartment; and MVB (Multifunction Vehicle Bus) that connect devices in the train. WTB and MVB are two separate communication subnets using different protocols, which are connected through a WTB node that is called the gateway. The gateway is responsible for conversions between the two protocols. In other words, MVB network and WTB network communicate through the gateway.

The conventional gateway is associated with several problems and deficiencies:

1) The WTB and MCB architecture includes the hardware structure of the existing gateway. Moreover, MCB also includes a central processor, an MVB unit, and an MVBCS01 protocol controller, etc., and also needs support of MVB-MAU. Thus MVB requires complex architecture design as well as complex hardware design, which inevitably leads to data exchange mechanism, increased considerations in software designs, and increased costs.

2) Periodic data transmission and sporadic data transmission time can be controlled by software. But because software execution itself takes time, and task switching and task executions also take time, the calculation of the frame times for data transmission control is not accurate, which can result in conflicts.

3) In existing TCN gateways, data communications between gateways can drop data frames. Once the data is lost, it will become a safe hazard for the train operations if the data is sent multiple times. In addition, the existing gateways are still insufficient in error correction capabilities. Once the data loss occurs, it is up to the gateway to determine if the problem arises from the communication process itself or other gateway nodes. Both cases can have very important impact on the safety of train's operations.

SUMMARY OF THE INVENTION

To overcome the problems of the existing technologies, the present invention is aimed to provide a LPC2468-based MVB-WTB gateway and associated working methods. The disclosed gateway is compatible with UIC556 agreement and has developed standard for train communication network from the perspective of user applications. The disclosed gateway and methods allow data communications among vehicles and equipment made by different manufacturers as long as their communication interfaces are compatible with UIC556 or suitable for conversions using simple interface protocol.

General aspects of the present invention can include one or more of the following:

An LPC2468-based MVB-WTB network gateway includes an MVB network card comprising: an MVB-ARM module; and an MVB-FPGA module; and a WTB network card comprising: WTB-ARM module; and a WTB-FPGA module, wherein the WTB network card and the MVB network card are connected by a main data bus, wherein the WTB-ARM module includes a LPC2468 based processor configured to analyze data in the network layer and the data link layer in gateway protocol, wherein the WTB-FPGA module is configured to send data to and receive data from other network gateways, and to exchange communication data between the WTB network card and the MVB network card in the same network gateway, wherein the MVB-ARM module is configured to execute a protocol stack in the MVB network card, wherein the MVB-FPGA module is configured to collect process and message data about MVB equipment, and exchange communication data between the WTB network card and the MVB network card within the network gateway.

In the course of the early running WTB network card, the WTB-ARM module is used to configure a main frame table in the network gateway in an initial run of the WTB network card, and to write the main frame table in the WTB-FPGA module.

The WTB-ARM module configures the main frame table based on requested characteristic period and process data length received from different MVB-WTB gateway nodes.

After the initial run of the WTB network card, the WTB-ARM module can write data received by an upper level application into the WTB-FPGA module, wherein the WTB-FPGA module is configured to determine when to send the process data and message data based on time configured in the WTB-FPGA, and to send the process and message data through the main data bus to the MVB-FPGA module.

The WTB-FPGA module can periodically poll the main frame table at each MVB-WTB gateway node, wherein the WTB-FPGA module can sporadically send monitoring data to the main data bus.

The main data bus is implemented by a PC104 bus, wherein the MVB network card is connected with the WTB network card via the PC104 bus, wherein each gateway further includes a MAU card configured to communicate with other network gateways, wherein the MAU card is connected to the WTB main bus, wherein each gateway further includes a WTB serial interface and a MVB serial interface, wherein the MVB serial interface is configured to provide maintenance and debugging for the MVB network card, wherein the WTB serial interface is configured to provide maintenance and debugging for the WTB network card, wherein the MVB network card also includes a manual reset key to be used for MVB reset operation, wherein the WTB network card includes a WTB manual reset button to be used for WTB reset operation, the LPC2468-based MVB-WTB network gateway further comprising a power interface configured to supply power.

A working method for LPC2468 based MVB-WTB network gateway, wherein the WTB-ARM module configures a main frame table in the network gateway in an initial run of the WTB network card, and to write the main frame table in the WTB-FPGA module, wherein after the initial run of the WTB network card, the WTB-ARM module is configured to write data received by an upper level application into the WTB-FPGA module, wherein the WTB-FPGA module is configured to determine when to send the process data and message data based on time configured in the WTB-FPGA, and to send the process and message data through the main data bus to the MVB-FPGA module.

The WTB-FPGA module can periodically poll the main frame table at each MVB-WTB gateway node, wherein the WTB-FPGA module can sporadically transmit monitoring data.

The WTB-FPGA module is configured to set up a queue to store data not timely processed in upper level applications in the WTB-FPGA module, wherein when the upper application in the WTB-FPGA module expects to receive the next data, if data type of a next expected data frame is the same as data type of the next data in the queue, it is determined that the next expected data is what the upper application currently expects to receive, wherein the next expected data is received and data updated; if data type of the next expected data frame is different from the data type of the next data in the queue, the next data in the queue is read until da the data last read has the same data type as the expected data.

The WTB-FPGA module includes a general-purpose register GEN_buf and a message register MD_buf configured to store data written in the last two cycles, wherein the WTB-FPGA module includes a procedure register PD_buf configured to store process data.

DETAILED DESCRIPTION OF THE INVENTION

The presently disclosed network gateway are described below from two aspects, namely, its hardware and software systems.

In terms of hardware, a LPC2468-based MVB-WTB Gateway includes: a WTB-ARM module, a WTB-FPGA module, an MVB-ARM module, an MVB-FPGA module, an MAU board, a PC104 bus, an MVB interface, an MAU interface, a WTB serial interface, an MVB serial interface, an MVB manual reset button, a WTB manual reset button, and a power supply interface. An MVB network card equipped with a PC104 interface collects process and message data about MVB equipment transmitted over the main data bus. The MVB network card is connected to a WTB network card via a PC104 bus; and the process and message data is transmitted from the MVB network card to the WTB network card. A MAU card that is connected to the WTB network card is a media connecting unit. The MAU card is part of the network gateway and is electrically connected to the main data bus. The MAU card provides and receives binary logic signals; forwards data received from the main data bus; and transmits data from the MVB network card via the WM network card. By connecting MAU cards in two MVB-WTB gateways, communications between the two network gateways are established, and data interoperability between the two network segments is achieved.

Figure 1:
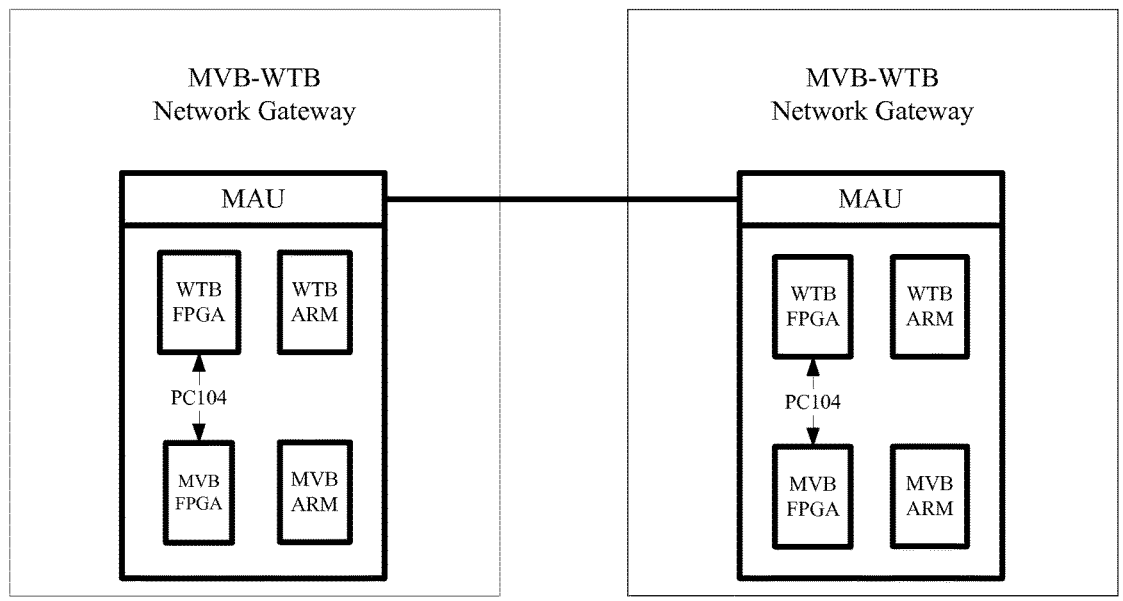
FIG. 1 is a schematic diagram for the hardware structures in a MVB-WTB network gateway.

FIG. 1 shows the hardware structure of the disclosed LPC2468 based WVB-WTB network gateway. The associated modules and interface functions are as follows:

1) The WTB-ARM module: the core of this section is a LPC2468 processor that conducts data processing in the network layer and the data link layer for the gateway's RTP protocol stack.

2) The WTB-FPGA modules: its function includes, first, transmitting and receiving communication data between the WTB network card of the same gateway with other network gateways, and secondly, exchanging communication data between the WTB and the MVB network card within the present gateway.

3) The MVB-ARM module: it is responsible for executing (running) the RTP protocol stack on the MVB network card.

4) The MVB-FPGA module: it is responsible for internal data communications between the MVB network card and the WTB in the same network gateway.

5) The MAU board: it is responsible for data communications between gateways.

6) The PC104 bus: it is responsible for data transfers between MVB and WTB.

7) The MVB interface: it provides a communication interface between the network gateway and other network card.

8) The MAU interface: it provides a communication interface between the present network gateway with other gateways.

9) The WTB serial interface: it is used for WTB maintenance and debugging.

10) The MVB serial interfaces: it is used for MVB maintenance and debugging.

11) The MVB manual reset button: the MVB reset operation can be conducted using this button.

12) The WTB manual reset button: the WTB reset operation can be conducted using this button.

13) The power Interface: it is used to supply power to MVB-WTB gateway devices.

Compared to conventional technologies, the presently disclosed apparatus and methods can include the following advantages:

A: A WTB FPGA chip board comprising a LPC2468 based hard core is integrated with an MVB board. FPGA is used for communications, which make communications more stable. In the communication process between WTB and WTB, the fast-response characteristics in FPGA allows increased communication speeds between network gateways, which enhances reliability.

One advantage of the presently disclosed system and method is in the simplicity in their hardware designs. All the required functionality of a TCN gateway is achieved by only two modules—the MVB and WTB modules; the MVB-MAU, MCB, MVBC protocol controllers in conventional systems are eliminated. Another advantage of the presently disclosed system and method is that it includes even fewer software modules. Because the decreased number hardware modules in the present system, the number of software modules is correspondingly decreased, which makes better integration of the software functions and easies coordination among software modules, which leads to more stable operations. Yet another advantage of the presently disclosed system and method is in its high execution speed. Because of MVB, WTB and FPGA are all integrated onto a single board, they can communicate with each other by using FPGA on board. The need for mechanisms such as CPCI-PC104 riser is eliminated. Lastly, the presently disclosed system and method can significantly reduce costs.

B: The conventional TCN gateway achieves control of data transmission cycles using upper level software in the operating system. The conventional TCN gateway, however, cannot accurately send data periodically because the processing of the operation system itself takes time, plus switching between tasks and responses all take time.

Figure 2:
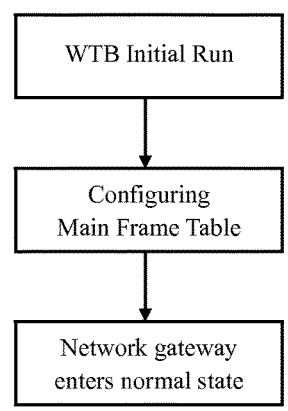
FIG. 2 is a flowchart for the main frame table.

To overcome this problem, before each initial run, the function of process data in the main frame table is down shifted to be realized in the WTB-FPGA. As shown in FIG. 2, the upper application process in WTB-ARM configures the main frame table according to the requested characteristic period and process data length at each node in the initial WTB run (i.e. at each MVB-WTB gateway node, each train group generally has 4 to 8 MVB-WTB gateway node), and write the main frame table in WTB-FPGA. After the initial run is completed, in the normal state, the upper level application simply writes the received data in WTB-FPGA. WTB-FPGA can determine when to send process data and message data according to the time configured in WTB-FPGA and sends the data to the PC104 bus. Another MVB-FPGA that is connected with the PC104 will read the corresponding data and inform the upper level application in MVB-ARM.

In the normal operating state, the bus master does not need to send, receive, or process data in the main frame; WTB-FPGA determines the type of frame (periodic or sporadic) to transmit according to the current state. In the periodic phase, WTB-FPGA achieves the function of polling the main frame table by polling each MVB-WTB gateway node. In the sporadic phase, WTB-FPGA sends surveillance data to the main data bus.

C: Existing gateway is prone to data loss in the communication processes. The data losses can include three cases, namely: WTB-FPGA abandons the data due to an error in the data transmission on the main data bus; the upper level application has no processed the data provided by WTB-FPGA; the upper level application has no sent out the data written into WTB-FPGA. Among the above cases, the first case can be reduced by improving the quality of the bus used to communicate; the second case can be avoided by software, which requires precise software functionality. The second case of data loss is herein reduced by the disclosed system and methods.

For the second case of gateway data loss, it is determined that the reason that the upper level application does not process the data provided by WTB-FPGA may be caused by too much data being received at high speed in the data transmission. The time interval between two data frames is too short. When WTB-FPGA received the frame data, node might have been dealing with other tasks, and thus did not timely respond to this data frame before that data is overwritten by the next frame of data, resulting in data loss.

In order to reduce data loss caused by too much data and the overwriting of newly arrived data at the MVB-WTB gateway, the disclosed WTB-FPGA module is configured to set up a queue when receiving data frames on the bus WTB. The queue reduces, to some extent, the probability of data being overwritten by the next data.

The difficulty in implementing the above method is if the upper level application does not timely process data after receiving last data frame, then the upper level application will read the data from the last data frame when it expects to receive the next data frame. If data types of the two data frames are the same, it will affect real-time updating of the data. If data types of the two data frames are different, an error will occur in gateway communication, resulting in error handling. In the present disclosure, a balanced approach is taken to address this issue. If the data type of the next expected data frame is the same as the data type of the next data in the queue, it is determined that the next expected data is what the upper level application is expecting to receive; the data is received and updated. If the data type of the next expected data frame is different from the data type of the next data in the queue, the next data in the queue is read until the data last read has the same data type as the expected data.

E: To address the third case of data loss, data is written to WTB-FPGA, the previous data is overwritten because due the two write operations are too close in time. A cache structure is set up in WTB-FPGA, including GEN_buf (general-purpose registers) and MD_buf (message registers) which save at least the data written in the last two cycles. A PD_buf (process register) is used to store the process data in cached data to allow data sent out as fresh as possible. Thus repeatedly data writing is prevented.

Detailed Implementations

A: The network gateway devices installed with onboard programs require a 5V DC power supply in operation. On the train's main bus, the presently disclosed network gateway devices communicate via an RS485 interface on the MAU with other gateway nodes. On the vehicle bus level, the disclosed network gateway devices communicate via the RS485 interface on the internal network card with other LAN equipment.

B: WTB and MVB are integrated onto a single board to form a gateway node. The WTB and the MVB communicate with each other via FPGA. The gateway node can communicate internally via vehicle bus MVB and externally via WTB, which connects the WTB network with the MVB network.

Figure 3:
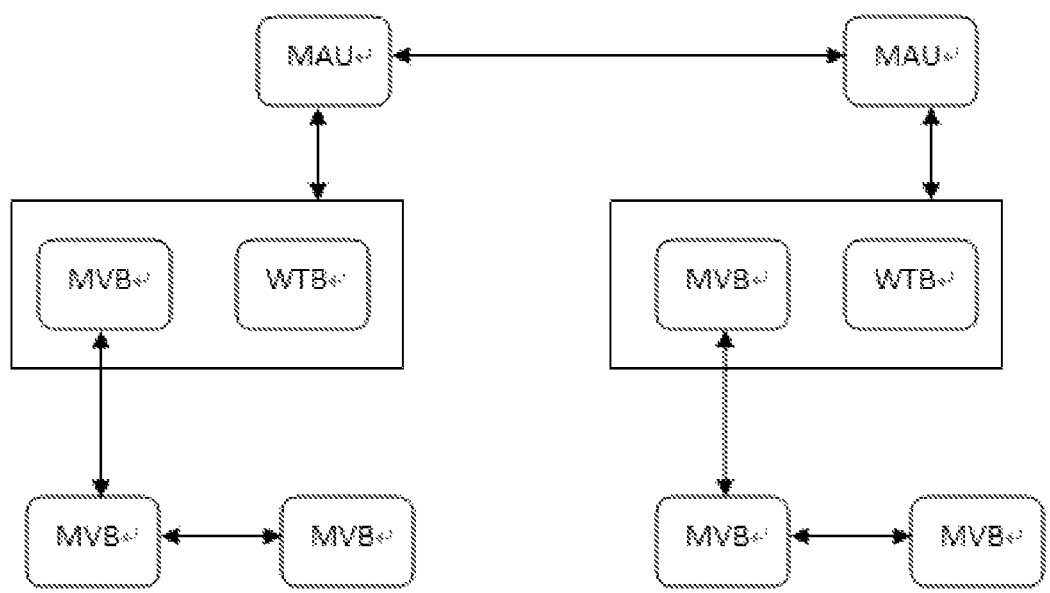
FIG. 3 is a connection diagram between network gateways and between a network gateway and an external network adapter.

Each gateway node includes a MAU board, which bears the tasks for transmitting signals for gateway hardware. The FPGA is responsible for processing data sent and received by the network gateway. Communications between the gateways are conducted over the train's main bus. FIG. 3 shows a connection diagram between network gateways and between a network gateway and an external network adapter. The two gateways are connected by the main data bus. Data on the main data bus is transmitted from the MVB network card to the WTB network card, and then to the WTB network card on the other end of WTB network. The WTB network card on the other side of the WTB network receives the data and sends the data via the MVB network card on the same board to the MVB devices in the same network. Data communications between the two networks (network section) are thus achieved.

Although the present invention is disclosed as above, it is not used to limit the present invention, any technical personnel of the technical field, within the spirit and scope of the present invention, can make arbitrary changes or equivalent replacement, so the protection scope of the present invention should be the scope defined by the claims of this application.

While this document contains many specifics, these should not be construed as limitations on the scope of an invention that is claimed or of what can be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or a variation of a sub-combination.

What is claimed is:

1. An LPC2468-based MVB-WTB network gateway, comprising:
    an MVB network card comprising:
        an MVB-ARM module; and
        an MVB-FPGA module; and
    a WTB network card comprising:
        WTB-ARM module; and
        a WTB-FPGA module,
    wherein the WTB network card and the MVB network card are connected by a main data bus, wherein the WTB-ARM module includes a LPC2468 based processor configured to analyze data in the network layer and the data link layer in gateway protocol, wherein the WTB-FPGA module is configured to send data to and receive data from other network gateways, and to exchange communication data between the WTB network card and the MVB network card in the same network gateway, wherein the MVB-ARM module is configured to execute a protocol stack in the MVB network card, wherein the MVB-FPGA module is configured to collect process and message data about MVB equipment, and exchange communication data between the WTB network card and the MVB network card within the network gateway.

2. The network gateway of claim 1, wherein the WTB-ARM module configures a main frame table in the network gateway in an initial run of the WTB network card, and to write the main frame table in the WTB-FPGA module.

3. The network gateway of claim 2, wherein the WTB-ARM module configures the main frame table based on requested characteristic period and process data length received from different MVB-WTB gateway nodes.

4. The network gateway of claim 2, wherein after the initial run of the WTB network card, the WTB-ARM module is configured to write data received by an upper level application into the WTB-FPGA module, wherein the WTB-FPGA module is configured to determine when to send the process data and message data based on time configured in the WTB-FPGA, and to send the process and message data through the main data bus to the MVB-FPGA module.

5. The network gateway of claim 1, wherein the WTB-FPGA module is configured to periodically poll the main frame table at each MVB-WTB gateway node, wherein the WTB-FPGA module is configured to sporadically send monitoring data to the main data bus.

6. The network gateway of claim 5, wherein the main data bus is implemented by a PC104 bus, wherein the MVB network card is connected with the WTB network card via the PC104 bus, wherein each gateway further includes a MAU card configured to communicate with other network gateways, wherein the MAU card is connected to the WTB main bus, wherein each gateway further includes a WTB serial interface and a MVB serial interface, wherein the MVB serial interface is configured to provide maintenance and debugging for the MVB network card, wherein the WTB serial interface is configured to provide maintenance and debugging for the WTB network card, wherein the MVB network card also includes a manual reset key to be used for MVB reset operation, wherein the WTB network card includes a WTB manual reset button to be used for WTB reset operation, the LPC2468-based MVB-WTB network gateway further comprising a power interface configured to supply power.

7. A method for operating a LPC2468based MVB-WTB network gateway as described in claim 1, wherein the WTB-ARM module configures a main frame table in the network gateway in an initial run of the WTB network card, and to write the main frame table in the WTB-FPGA module, wherein after the initial run of the WTB network card, the WTB-ARM module is configured to write data received by an upper level application into the WTB-FPGA module, wherein the WTB-FPGA module is configured to determine when to send the process data and message data based on time configured in the WTB-FPGA, and to send the process and message data through the main data bus to the MVB-FPGA module.

8. The method of claim 7, wherein the WTB-FPGA module is configured to periodically poll the main frame table at each MVB-WTB gateway node, wherein the WTB-FPGA module is configured to sporadically transmit monitoring data.

9. The method of claim 7, wherein the WTB-FPGA module is configured to set up a queue to store data not timely processed in upper level applications in the WTB-FPGA module, wherein when the upper application in the WTB-FPGA module expects to receive the next data,
    if data type of a next expected data frame is the same as data type of the next data in the queue, it is determined that the next expected data is what the upper application currently expects to receive, wherein the next expected data is received and data updated;
    if data type of the next expected data frame is different from the data type of the next data in the queue, the next data in the queue is read until da the data last read has the same data type as the expected data.

10. The method of claim 7, wherein the WTB-FPGA module includes a general-purpose register GEN_buf and a message register MD_buf configured to store data written in the last two cycles, wherein the WTB-FPGA module includes a procedure register PD_buf configured to store process data.

* * * * *